US010774583B1

(12) United States Patent
Chuang

(10) Patent No.: US 10,774,583 B1
(45) Date of Patent: Sep. 15, 2020

(54) CRANK STRUCTURE FOR A CURTAIN

(71) Applicant: ABO WINDOW FASHION CORP, Chino, CA (US)

(72) Inventor: Shan-Chi Chuang, New Taipei (TW)

(73) Assignee: ABO WINDOW FASHION CORP., Chino, CA (US)

( * ) Notice: Subject to any disclaimer, the term of this patent is extended or adjusted under 35 U.S.C. 154(b) by 33 days.

(21) Appl. No.: 16/284,748

(22) Filed: Feb. 25, 2019

(51) Int. Cl.
*E06B 9/56* (2006.01)
*E06B 9/322* (2006.01)
*F16H 1/06* (2006.01)

(52) U.S. Cl.
CPC ............... *E06B 9/322* (2013.01); *F16H 1/06* (2013.01)

(58) Field of Classification Search
CPC . G05G 1/085; G05G 1/10; G05G 1/08; E06B 9/322; E06B 9/32; E06B 9/364; E06B 9/56; E06B 9/78
See application file for complete search history.

(56) References Cited

U.S. PATENT DOCUMENTS

| | | | | |
|---|---|---|---|---|
| 3,308,679 A | * | 3/1967 | Joselyn | E06B 9/32 74/531 |
| 3,638,358 A | * | 2/1972 | Mason | E05F 11/06 49/325 |
| 8,950,385 B1 | * | 2/2015 | Khoshnood | F41B 5/1469 124/1 |
| 9,949,469 B1 | * | 4/2018 | Carpenter | A01K 89/01085 |
| 2009/0205788 A1 | * | 8/2009 | Cannaverde | E06B 9/38 160/168.1 R |
| 2010/0181409 A1 | * | 7/2010 | Chen | E06B 9/303 242/376 |
| 2018/0171707 A1 | * | 6/2018 | Marocco | E06B 9/78 |
| 2018/0320814 A1 | * | 11/2018 | Cahill | F16M 11/18 |
| 2019/0264502 A1 | * | 8/2019 | Marocco | E06B 9/50 |
| 2019/0264503 A1 | * | 8/2019 | Marocco | E06B 9/78 |
| 2019/0390514 A1 | * | 12/2019 | Marocco | E06B 9/326 |

* cited by examiner

*Primary Examiner* — Richard W Ridley
*Assistant Examiner* — Brian J McGovern

(57) ABSTRACT

A crank structure for a curtain has a base, a rolling wheel set, an engagement set and a crank. The base has a bottom plate and a limiting frame. The rolling wheel set is disposed in the storing space of the base and has two rolling wheels. Each central aperture is jacketed onto the central shaft of the storing space. The two rolling wheels is further respectively provided with a braking gear and an inclined ring. Each inclined ring has a plurality of engagement ribs. The engagement set disposed in the assembling portion of the base and has a socket, a supporting wheel and a bottom member. An engaging pattern is provided at a periphery of the supporting wheel, a passive gear is provided at the supporting wheel, and a shaft is provide at a center position of the supporting wheel.

8 Claims, 9 Drawing Sheets

US 10,774,583 B1

CRANK STRUCTURE FOR A CURTAIN

BACKGROUND OF INVENTION

1. Field of Invention

The present invention relates to curtains, and more particularly to a crank structure for a curtain.

2. Description of the Related Art

Accordingly, curtains are used in modern living rooms, mainly for shading and privacy protection. They are also used to embellish and decorate living area and even highlight the style. However, in order to facilitate the unfolding and winding of the curtains, the modern curtains need to corporate with a pull cord to lift and lower of the curtain blades. However, the falling length of the pull cord is easy to float with the wind, which often causes the entanglement and knotting of the pull cord, and affects the normal operation of the curtain. Furthermore, long hanging cords are mostly made of strong ropes or chains, it is also common for young children in the family to pull the ropes to play with the curtains and cause accidents.

Therefore, it is desirable to provide a vertical blinds structure to mitigate and/or obviate the aforementioned problems.

SUMMARY OF THE INVENTION

An objective of present invention is to provide a a crank structure for a curtain with improvements.

To achieve these and other objects of the present invention, a crank structure for a curtain has a base, a rolling wheel set, an engagement set and a crank. The base has a bottom plate and a tear-shaped limiting frame, the limiting frame has a round shaped storing space with a central shaft, an exit channel disposed above the storing space, and a hollow assembling portion is connected to the storing space and having a groove. The rolling wheel set is disposed in the storing space of the base and has two rolling wheels each respectively having a central aperture and a plurality of assembling apertures. Each central aperture is jacketed onto the central shaft of the storing space. The two rolling wheels is further respectively provided with a braking gear at each outer side and an inclined ring at a periphery of each facing inner side. Each inclined ring has a plurality of engagement ribs. The engagement set disposed in the assembling portion of the base and has a socket, a supporting wheel and a bottom member. The socket has an H shape, two parallel members of the socket provided with a corresponding axial aperture, the horizontal member is provided with a slot. An engaging pattern is provided at a periphery of the supporting wheel, a passive gear is provided at a back side of the supporting wheel, and a shaft is provide at a center position of the supporting wheel and passing through both axial apertures of the two parallel members. The bottom member is secured at a bottom end of the assembling portion and further has a limiting column facing the socket. The limiting column is configured for being jacketed with an elastic member and pushes against the socket and the supporting wheel with the elastic member. The passive gear and the rolling wheel set engages, and the supporting wheel is disposed between the two rolling wheels. The crank is disposed in the storing space of the limiting frame and has a cover and an arm, and the cover is provided with two assembling columns coupling with the two assembling apertures of one of the rolling wheels.

Other objects, advantages, and novel features of invention will become more apparent from the following detailed description when taken in conjunction with the accompanying drawings.

DETAILED DESCRIPTION OF THE PREFERRED EMBODIMENT

Figure 1:
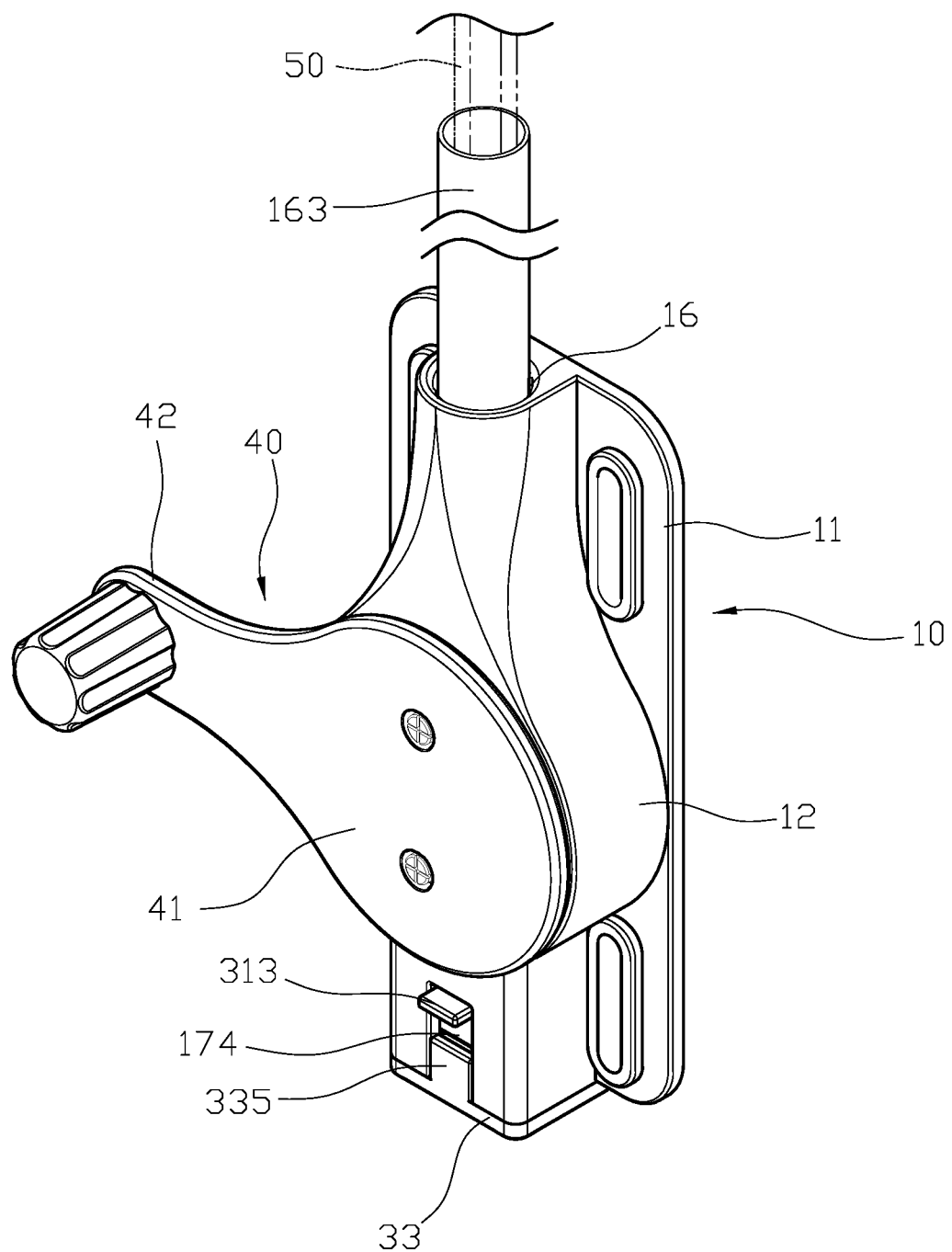
FIG. 1 is a perspective view of a preferred embodiment according to the present invention.
Figure 2:
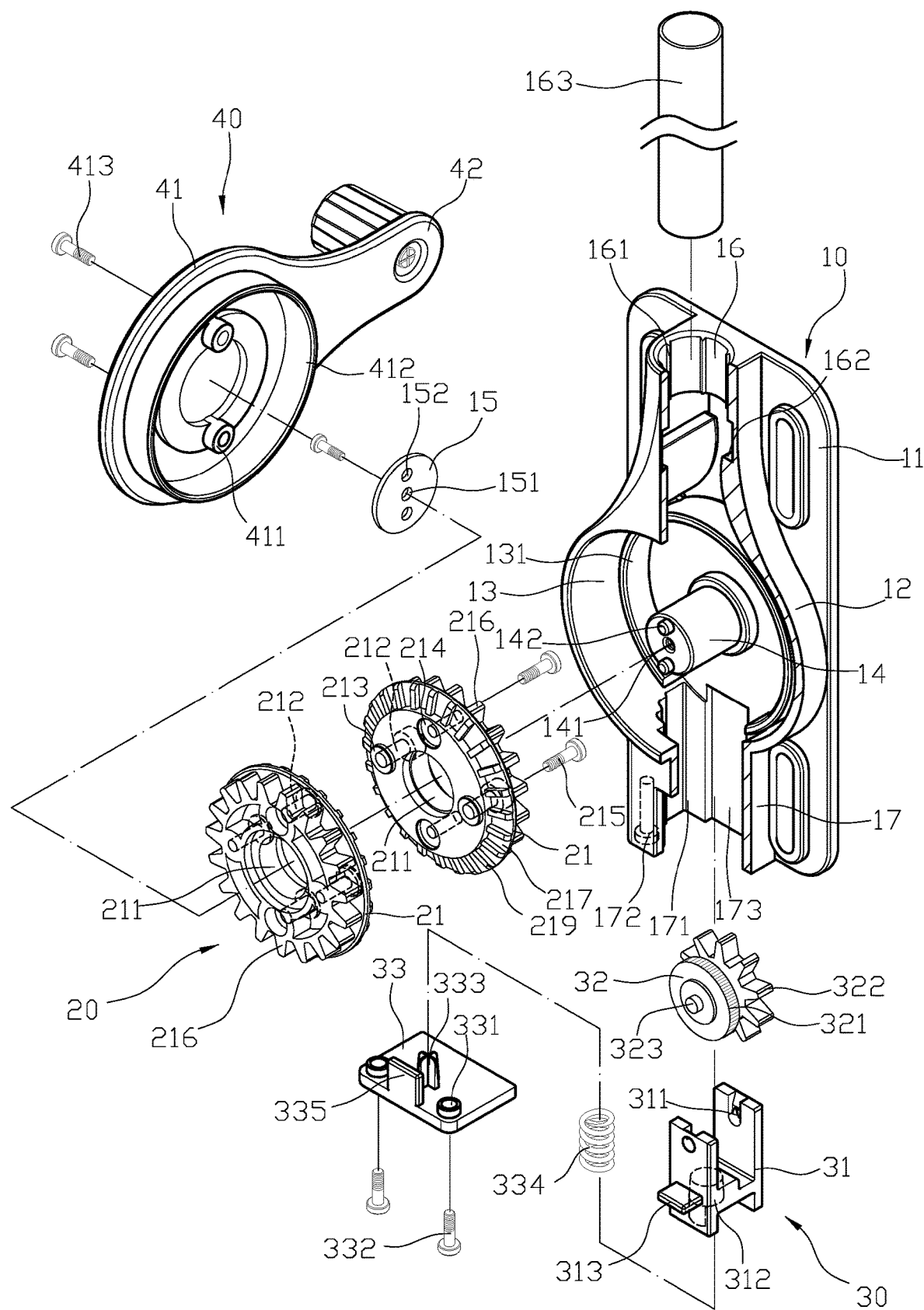
FIG. 2 is an exploded view of the preferred embodiment according to the present invention.
Figure 3:
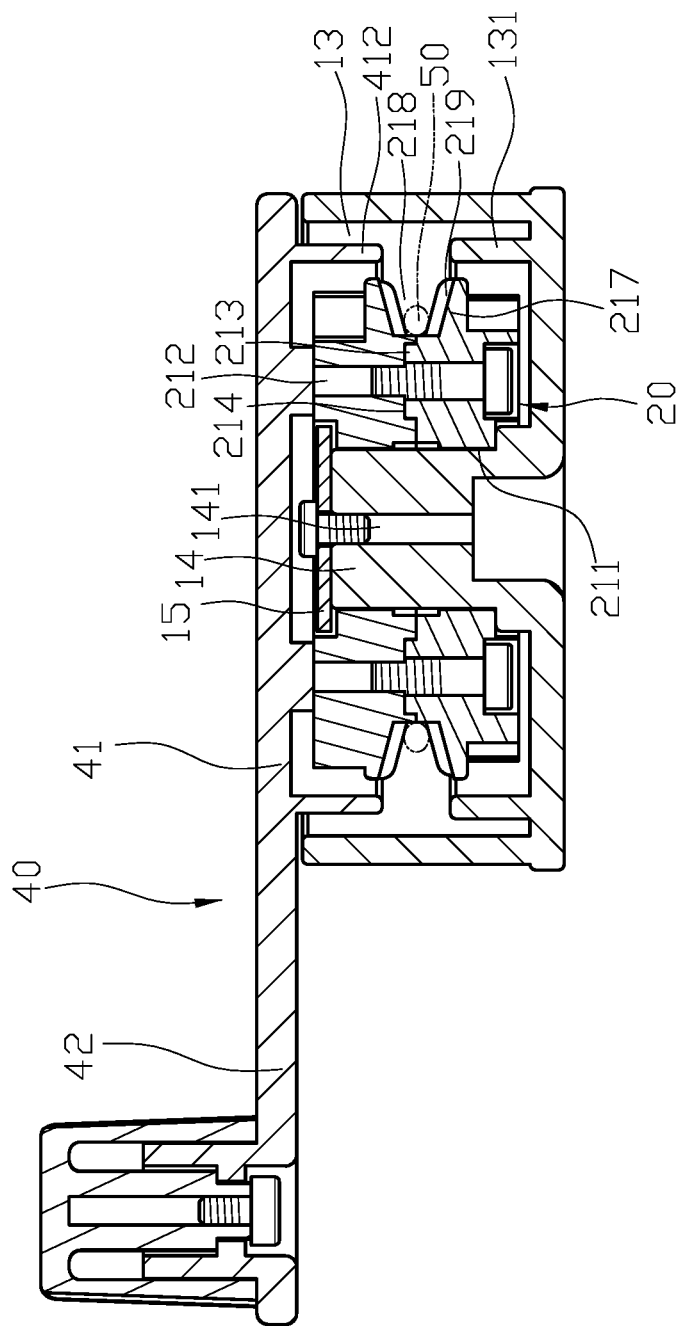
FIG. 3 is a cross-sectional view of the combination of the preferred embodiment according to the present invention.

First, please refer to FIGS. 1, 2, and 3. A crank structure for a curtain comprises: a base 10, a rolling wheel set 20, an engagement set 30 and a crank 40. The base 10 has a bottom plate 11 and a tear-shaped limiting frame 12, and the limiting frame 12 has a round shaped storing space 13 with a central shaft 14. The central shaft 14 further has a center screw hole 141, two convex members 142 around the center screw hole 141, and a positioning member 15. The positioning member 15 has a through aperture 151 and two concave holes 152. An exit channel 16 is disposed above the storing space 13 and is provided with a plurality of vertical ribs 161 and a stepped portion 162 for coupling with a sleeve 163. The limiting frame 12 is further provided with an assembling portion 17 connected to the storing space 13 and having a groove 171. An orifice and two assembling screw holes are provided at the bottom of the groove 171. The groove 171 is further provided with a vertical slot 173 and a through hole 174. The storing space 13 is further provided with a first ring member 131 lower than the limiting frame 12, and the first ring member 131 has an opening connected with the groove 171. The rolling wheel set 20 is disposed in the storing space 13 of the base 10 and has two rolling wheels 21 each respectively having a central aperture 211 and a plurality of assembling apertures 212. Two facing sides of the two rolling wheels 21 are provided with corresponding protrusions 213 and recesses 214 around each assembling aperture 212 for engaging the two rolling wheels 22, and the two assembling apertures 212 are secured with a locking member 215. The two rolling wheels 21 further respectively provided with a braking gear 216 at each outer side and an inclined ring 217 at a periphery of each facing inner side, and each inclined ring 217 has a plurality of engagement ribs 219. The engagement set 30 is disposed in the assembling portion 17 of the base 10 and has a socket 31, a supporting wheel 32 and a bottom member 33. The socket 31 has an H shape, two parallel members of the socket 31 are respectively provided with a corresponding axial aperture 311, and the horizontal member is provided with a slot 312. The socket 31 of the engagement set 30 further has a trigger 313 passing through the through hole 174. An engaging pattern 321 is provided at a periphery of the supporting wheel 32, a passive gear 322 is provided at a back side of the supporting wheel 32, and a shaft 323 is provide at a center position of the supporting wheel 32 and passes through both axial apertures 311 of the two parallel vertical members. The bottom member 33 has two assembling holes 331 secured with two locking members 332 and the assembling portion 17, and the bottom member 33 further has a limiting column 333 facing the socket 31, and the limiting column 33 is configured for being jacketed with an elastic member 34 and pushes against the socket 31 and the supporting wheel 32 with the elastic member 334. Therefore, the passive gear 322 and the rolling wheel set 20 engages together, and the supporting wheel 32 is correspondingly disposed between the two rolling wheels 21. The bottom member 33 further has a positioning cover 335 corresponding to the through hole 174, which defines a distance for the trigger 313 to move the socket 31. The crank 40 is disposed in the storing space 13 of the limiting frame 12 and has a cover 41 and an arm 42. The cover 41 is provided with two assembling columns 411 coupling with two assembling apertures 21 of one of the rolling wheels 21. The cover 41 of the crank 40 further has a second ring member 412 corresponding to the first ring member 131, and the second ring member 412 is separated from the first ring member 131 by a gap.

For the composition of the structure, please refer to FIGS. 2, 3, 4, and 5. The crank 40 is assembled with the base 10, the rolling wheel set 20, the engagement set 30, and the crank 40 sequentially. The rolling wheel set 20 combines the two rolling wheels 21 together with the sides having the inclined ring 217 facing each other which positioned by the protrusion 213 and the recess 214 provided on the assembly aperture 212 and then secured by the two locking members 215 to complete the assembly of the rolling wheel set 20. The inclined rings 217 of the two rolling wheels 21 form a V-shaped ring groove 218, and the central aperture 211 of the rolling wheel set 20 is placed through the central shaft 14 of the storage space 13. A positioning member 15 is further provided at the end of the central shaft 14 which is configured for limiting the supporting wheel set 20 to the storage space 13. The supporting wheel 32 of the supporting set 30 utilizes the shaft 323 to being pivoted across the shaft holes 311 of the two vertical members on both sides of the socket 31. The bottom member 33 is pivoted below the socket 31, and the limiting column 333 is sleeved an elastic member 334 and placed against the slot 312 of the socket 31. Finally, the engagement set 30 is assembled from the bottom up into the groove 171 of the assembly portion 17, the vertical members of the socket 31 is incorporated into the groove 171 along the vertical slot 173, the trigger 313 protrudes from the through hole 174 of the assembling portion 17, and the bottom member 33 is coupled with the locking member 332 and fixed on the bottom of the groove 171. Therefore, the socket 31 is pushed up by the elastic member 334, the supporting wheel 32 is located in the V-shaped ring groove 218 of the two rolling wheels 21, and the passive gear 322 and the braking gear 216 of one rolling wheel 21 are engaged to form a linkage. Finally, the crank 40 is mounted in the storage space 13 of the limiting frame 12, the second ring member 412 is embedded in the storing space 13, and the two assembling columns 411 of the cover 41 are inserted into the two assembling apertures 212 of the two rolling wheels 21. Further, the cover 41 is restrained by the orifice, and the assembling column 411 is further locked with the rolling wheel 21 by the bolt 413. Therefore, the rotation of the crank 40 can drive the rolling wheel set 20.

Figure 6:
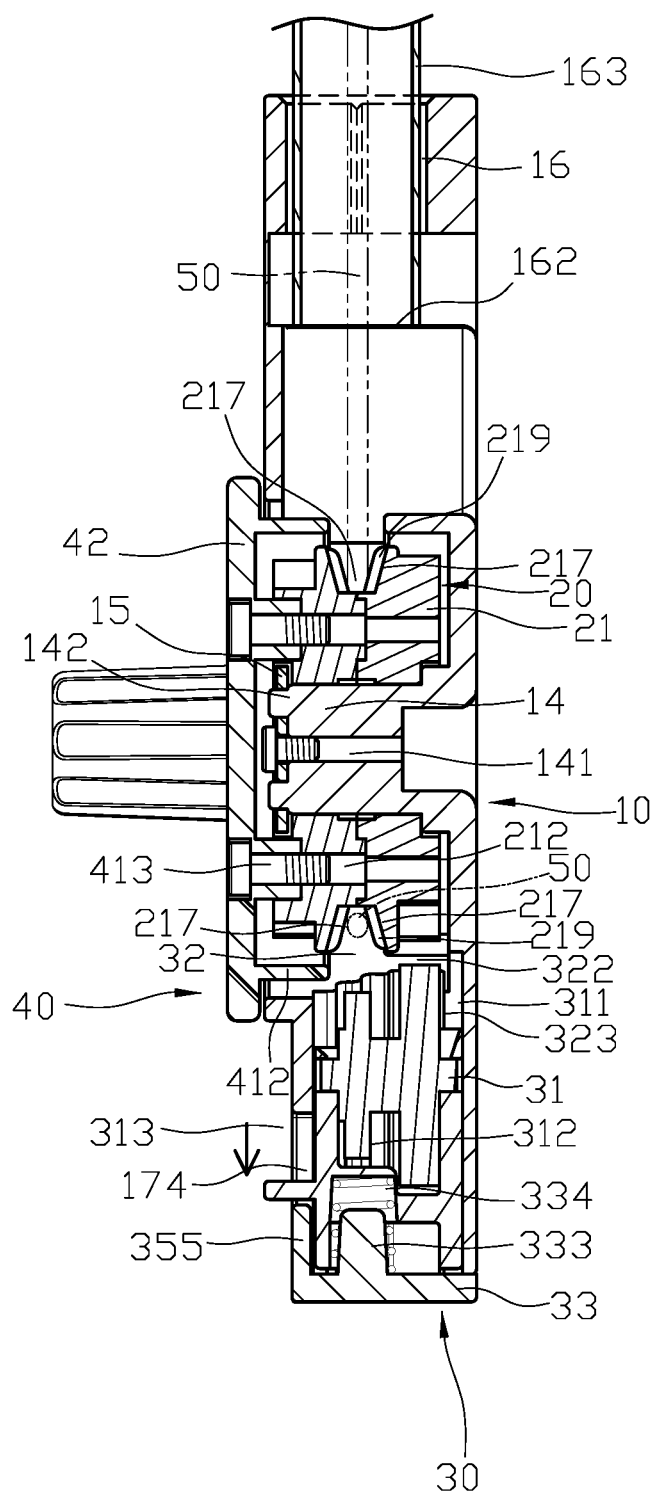
FIG. 6 is a schematic drawing showing the socket being pressed down away from the rolling wheel set according to the present invention.
Figure 7:
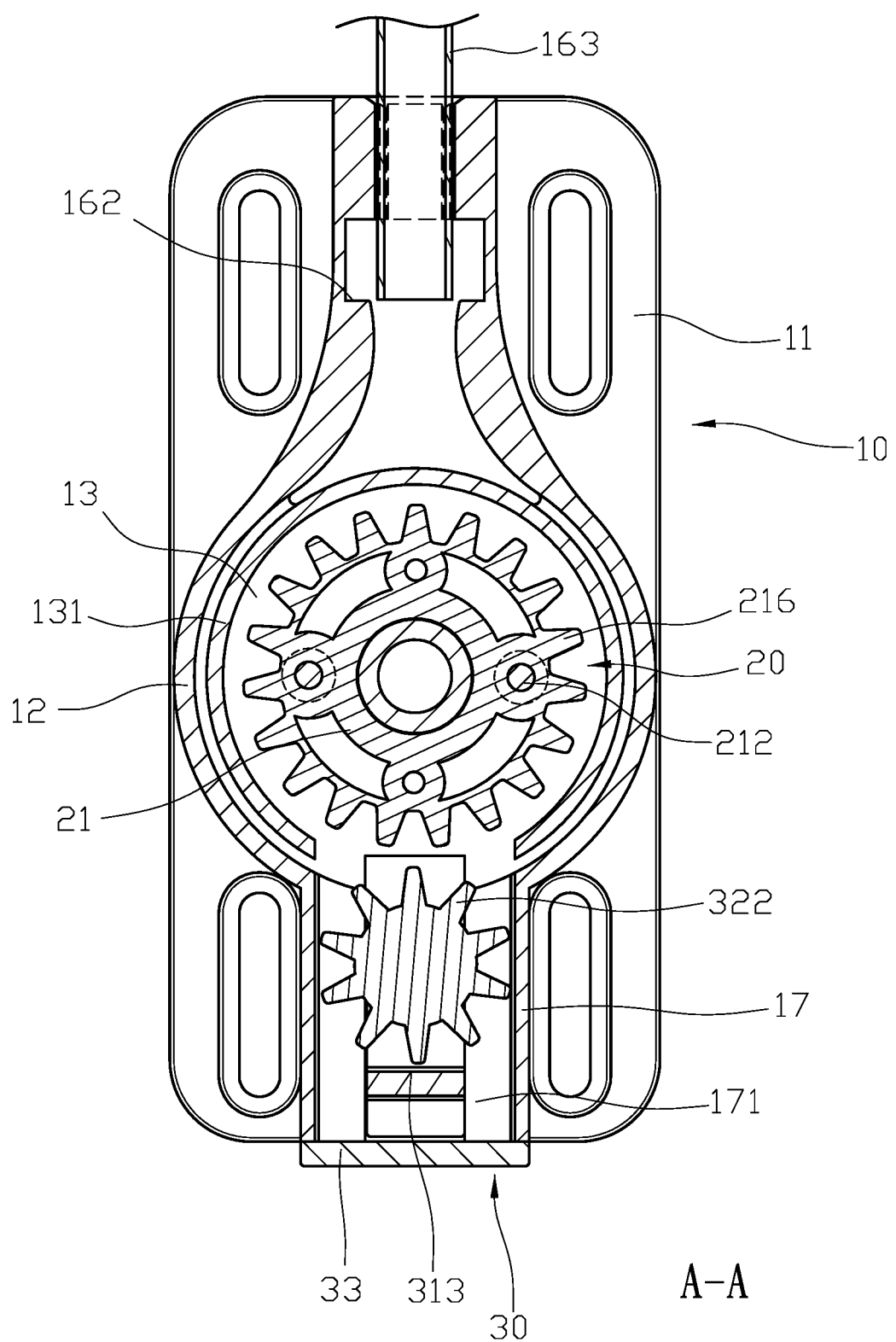
FIG. 7 is a schematic drawing showing the engagement set being away from the line A-A of the rolling wheel set according to the present invention.
Figure 8:
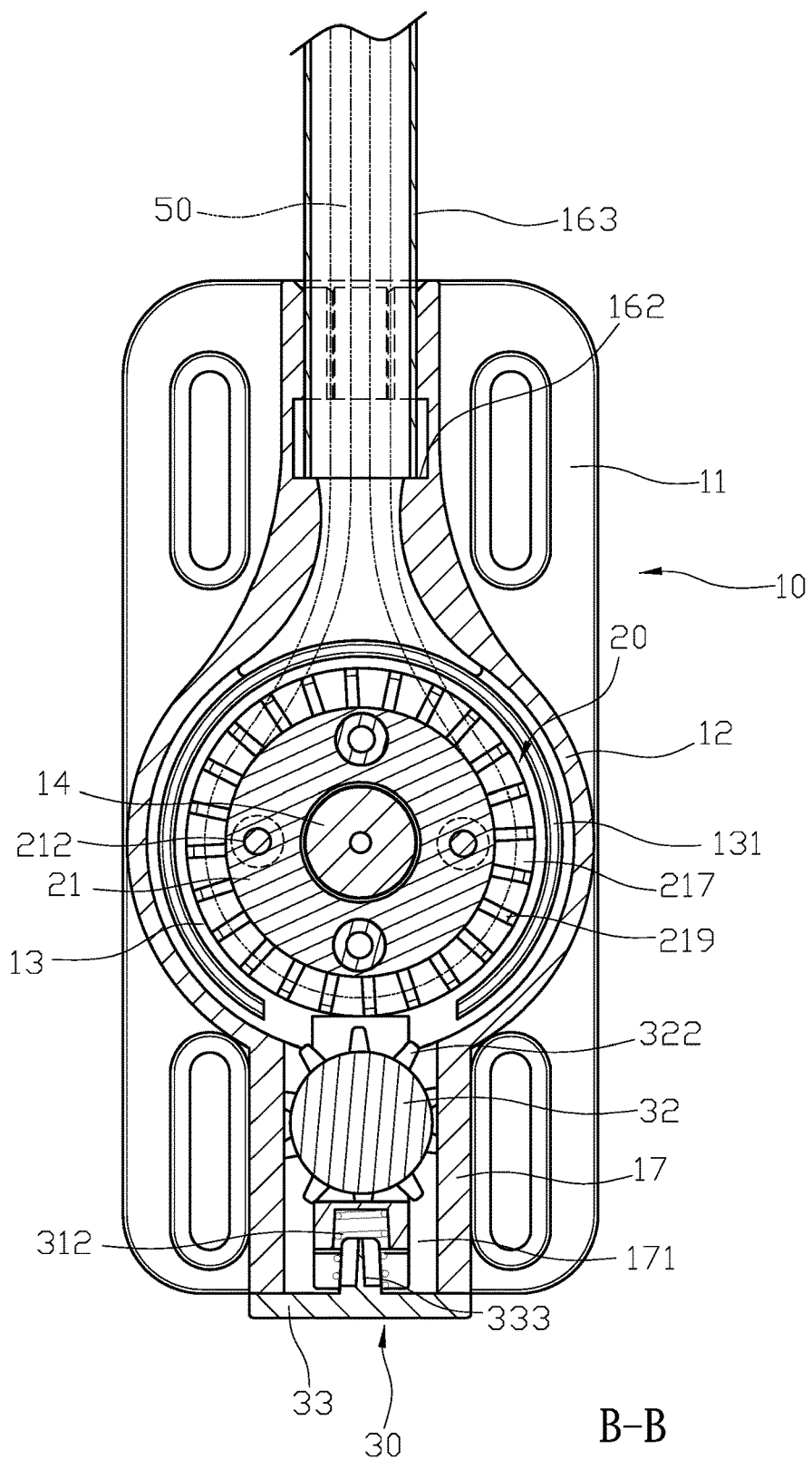
FIG. 8 is a schematic view showing the engagement set being away from the B-B line of the rolling wheel set according to the present invention.

The actual use of the structure, as shown in FIGS. 6, 7, and 8. The crank structure is fixed to the wall through the base 10 and corporates with the rope 50 of the curtain. The rope 50 is placed vertical and has with a loop at its end. Since the engagement set 30 is normally pushed by the elastic member 334 and touches the rolling wheel set 20, the rope 50 is required to be equipped with the crank 40 while the crank 40 is removed from the base 10, and then the trigger 313 protruding from the through hole 174 is pulled down, so that the socket 31 is turned downwardly and the supporting wheel 32 is apart from the rolling wheel set 20. Meanwhile, the rope 50 can be introduced into the storing space 13 from the exit channel 16, and then wound around the V-ring groove 218 of the rolling wheel set 20 and form a tight state. By releasing the trigger 313, the rope 50 is pushed by the elastic member 334 and clamped between the V-ring grooves 218 by the supporting wheel 32. Furthermore, the passive gear 322 simultaneously engages with the braking gear 216 of the rolling wheel 21, and then finally the crank 40 is reinstalled to complete the assembly. This crank structure can be additionally installed on the existing curtains with rope, which greatly enhances the practicability of the structure.

Figure 4:
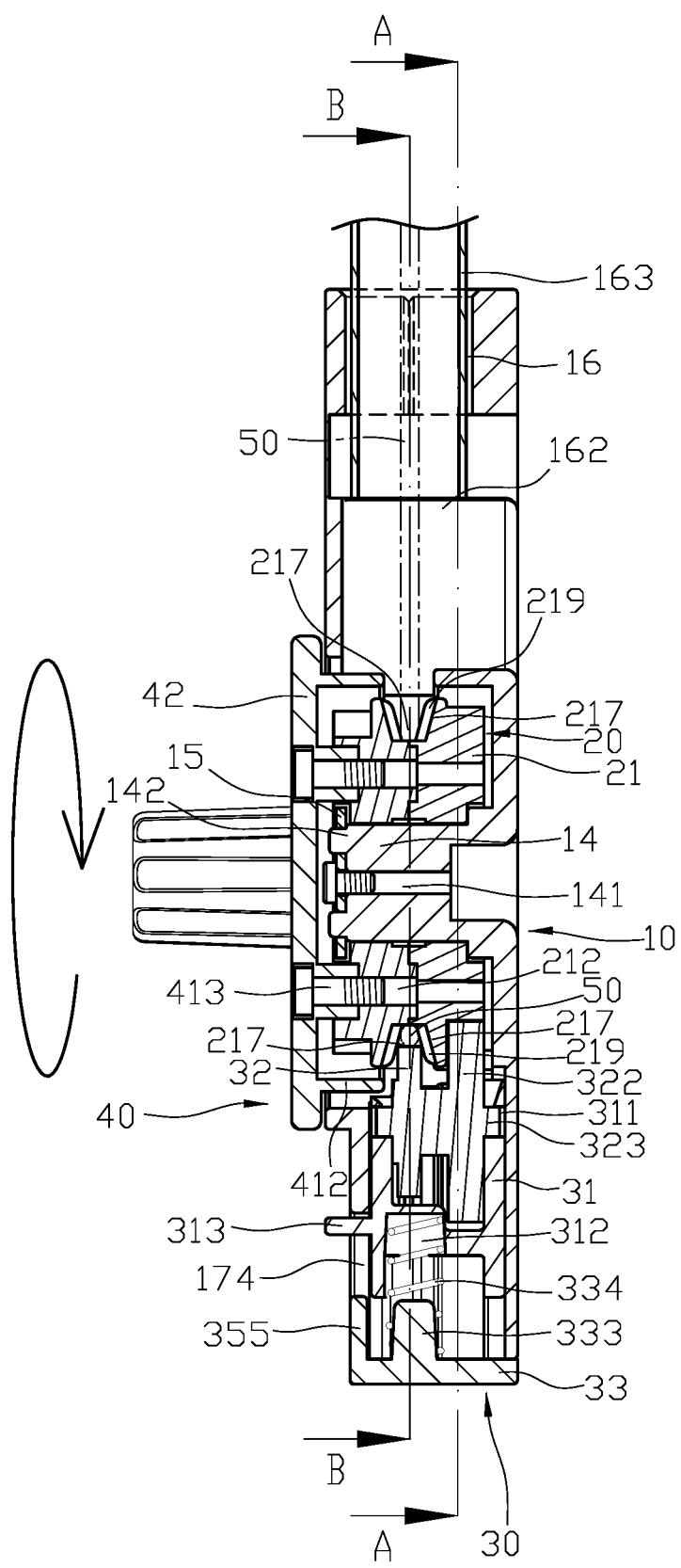
FIG. 4 is a cross-sectional view of the combination of another perspective of the preferred embodiment according to the present invention.
Figure 5:
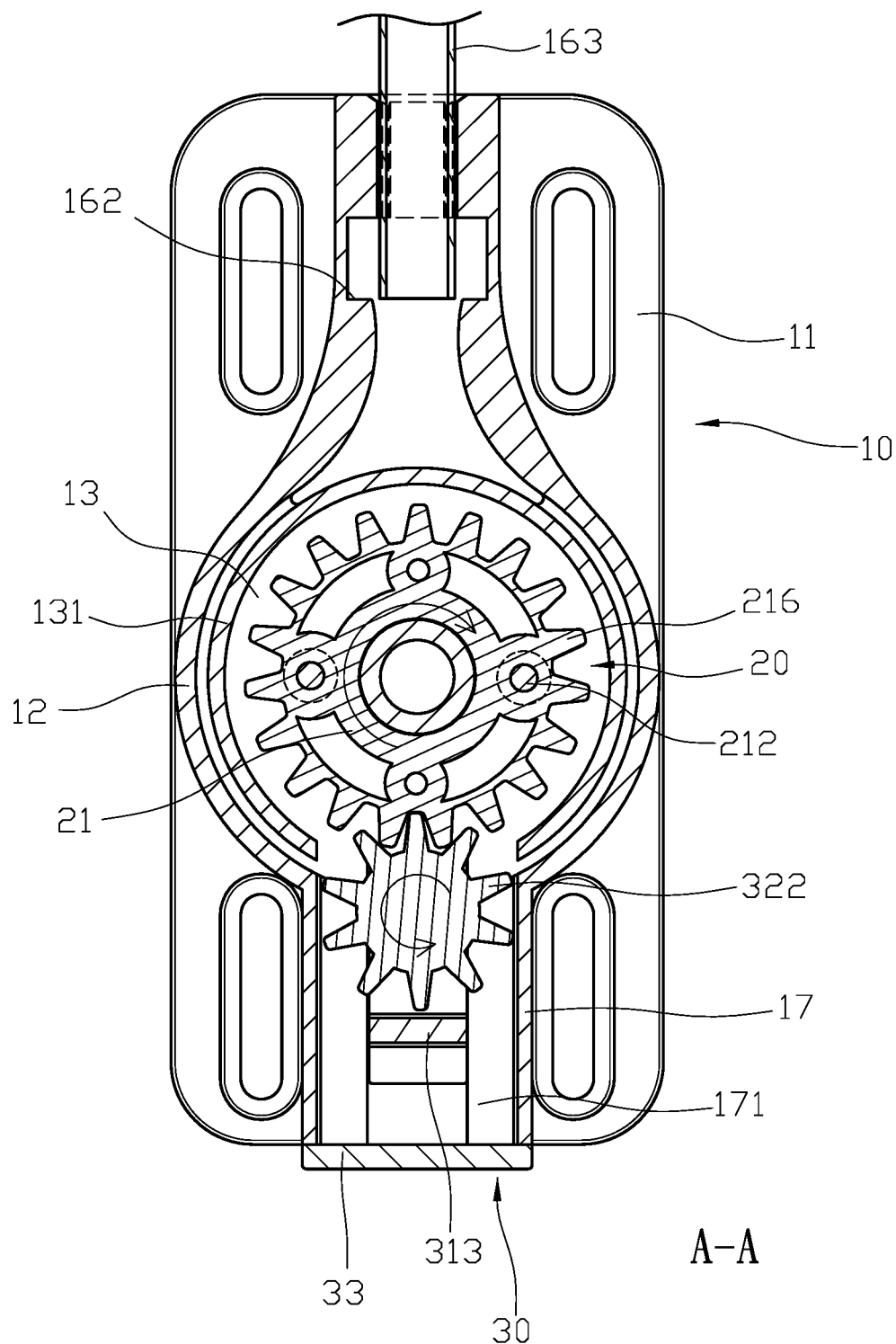
FIG. 5 is a sectional view showing the combination of the line A-A in FIG. 4 of the preferred embodiment according to the present invention.
Figure 9:
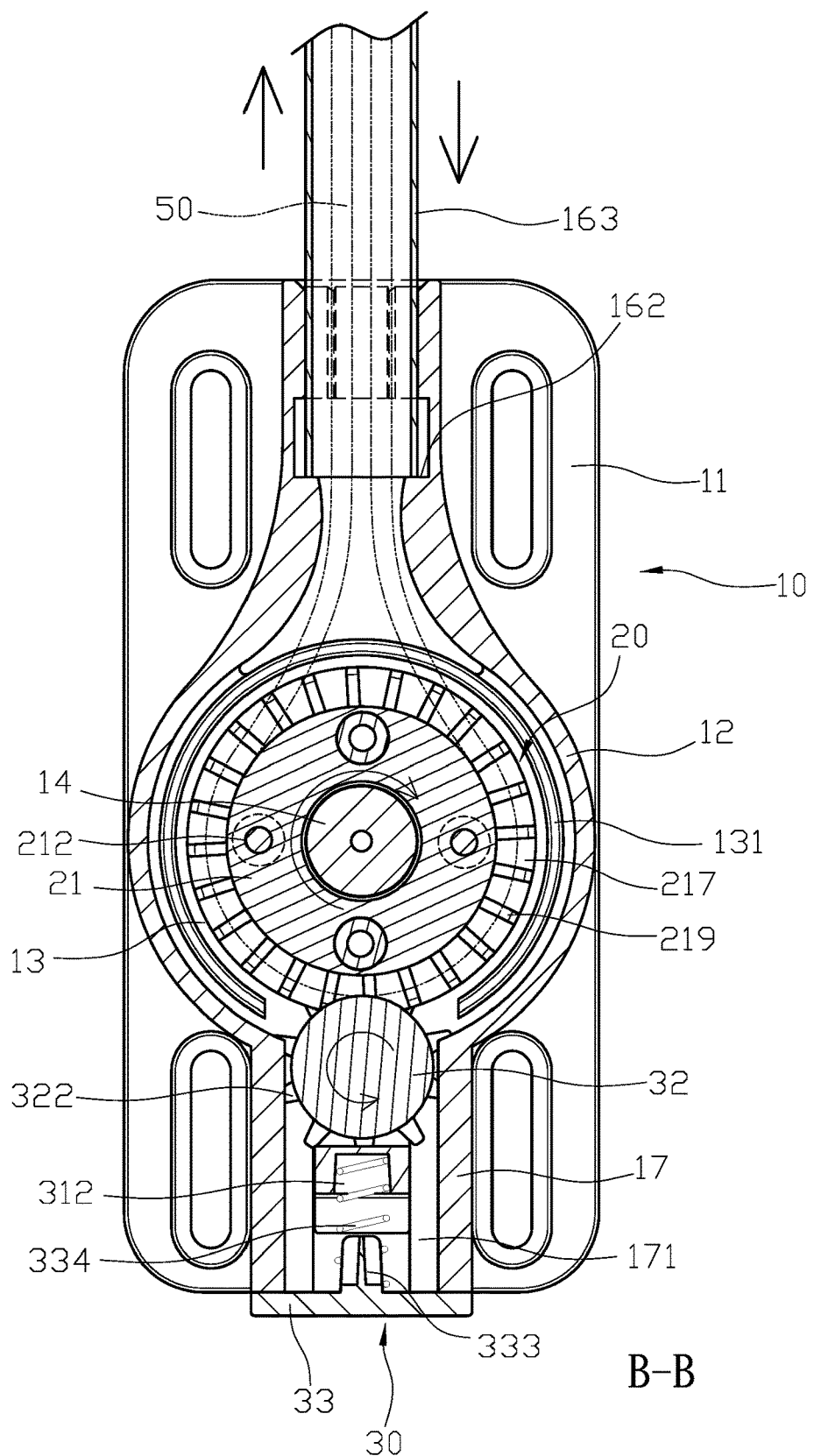
FIG. 9 is a schematic drawings showing the state of action of the preferred embodiment according to the present invention.

The actual state of the structure is retracted, and then refer to FIGS. 3, 4, and 5 in conjunction with FIG. 9. Since the rope 50 is looped around the V-shaped ring groove 218 of the rolling wheel set 20 and clamped by the supporting wheel 32, the passive gear 322 of the supporting wheel 32 engages with the braking gear 216 of the two rolling wheel 21, when the user rotates the crank 40, the rolling wheel set 20 rotates as the crank 40 rotates and drives the supporting wheel 32 to rotate, and the engagement rib 219 of the inclined ring 217 of the two rolling wheels 21 and the engaging pattern 321 on the supporting wheel 32 clamp the rope 50 to form a pulling down and pushing up repeating cycle to control operation of the curtain.

According to the structure of the above specific embodiment, the following benefits can be obtained: the crank structure can be additionally installed on the existing curtains with drawstring in the market, so that the consumer can be benefited through the simplest installation method. The installation of the crank structure is simple and fast, which greatly improves the practicability of the structure and. In addition, when the rope 50 is used with the crank structure, the rope 50 is linearly restricted between the curtain upper rail and the crank, so the rope 50 can be prevented from swinging to form an entanglement and knotting which prevents infants, young children, children from playing with it Although the present invention has been explained in relation to its preferred embodiment, it is to be understood that many other possible modifications and variations can be made without departing from the spirit and scope of invention as hereinafter claimed.

What is claimed is:

1. A crank structure for a curtain comprising:
   a base having a bottom plate and a tear-shaped limiting frame, the limiting frame having a round shaped storing space with a central shaft, an exit channel disposed above the storing space, and a hollow assembling portion connected to the storing space and having a groove;

a rolling wheel set disposed in the storing space of the base and having two rolling wheels each respectively having a central aperture and a plurality of assembling apertures; each central aperture is jacketed onto the central shaft of the storing space; the two rolling wheels further respectively provided with a braking gear at each outer side and an inclined ring at a periphery of each facing inner side; each inclined ring having a plurality of engagement ribs;

an engagement set disposed in the assembling portion of the base and having a socket, a supporting wheel and a bottom member; the socket having an H shape, two parallel members of the socket provided with a corresponding axial aperture, the horizontal member provided with a slot;

an engaging pattern provided at a periphery of the supporting wheel, a passive gear provided at a back side of the supporting wheel, and a shaft provide at a center position of the supporting wheel and passing through both axial apertures of the two parallel members; the bottom member secured at a bottom end of the assembling portion and further having a limiting column facing the socket; the limiting column configured for being jacketed with an elastic member and pushing against the socket and the supporting wheel with the elastic member; the passive gear and the rolling wheel set engaging, and the supporting wheel disposed between the two rolling wheels; and a crank disposed in the storing space of the limiting frame and having a cover and an arm, the cover provided with two assembling columns coupling with the two assembling apertures of one of the rolling wheels.

2. The crank structure for a curtain as claimed in claim 1, wherein the storing space is further provided with a first ring member lower than the limiting frame, the first ring member having an opening connected with the groove; the cover of the crank further has a second ring member corresponding to the first ring member, and the second ring member is separated from the first ring member by a gap.

3. The crank structure for a curtain as claimed in claim 1, wherein the exit channel is provided with a plurality of vertical ribs and a stepped portion for coupling with a sleeve.

4. The crank structure for a curtain as claimed in claim 1, wherein two facing sides of the two rolling wheels are provided with corresponding protrusions and recesses around each assembling aperture for engaging the two rolling wheels, and at least two assembling apertures are secured with a locking member.

5. The crank structure for a curtain as claimed in claim 1, wherein the central shaft further has a center screw hole, two convex members around the center screw hole, and a positioning member, and the positioning member has a through aperture and two concave holes.

6. The crank structure for a curtain as claimed in claim 1, wherein the assembling portion is provided with an orifice and two assembling screw holes, and the groove is provided with a through hole.

7. The crank structure for a curtain as claimed in claim 6, wherein the socket of the engagement set further has a trigger passing through the through hole, the bottom member further has two assembling holes secured with two locking members and the assembling portion, and the bottom member further has a positioning cover corresponding to the through hole.

8. The crank structure for a curtain as claimed in claim 1, wherein the groove of the assembling portion is further provided with a vertical slot for positioning the vertical members of the socket.

\* \* \* \* \*